(No Model.) 3 Sheets—Sheet 1.

A. JEENEL.
VEHICLE BRAKE.

No. 399,668. Patented Mar. 19, 1889.

Witnesses:
Wm Wagner
A Jonghmans

Inventor
A. Jeenel
by his attorneys
Roeder & Briesen (No Model.) 3 Sheets—Sheet 2.

A. JEENEL.
VEHICLE BRAKE.

No. 399,668. Patented Mar. 19, 1889.

Witnesses:
Wm Wagner
A. Jonghmans

Inventor:
A. Jeenel
by his attorneys
Roeder & Brieren (No Model.) 3 Sheets—Sheet 3.

A. JEENEL.
VEHICLE BRAKE.

No. 399,668. Patented Mar. 19, 1889.

Witnesses:
Wm Wagner
A. Jonghmans

Inventor:
A. Jeenel
by his attorneys
Roeder & Briesen

UNITED STATES PATENT OFFICE.

ADOLF JEENEL, OF BRESLAU, PRUSSIA, GERMANY.

VEHICLE-BRAKE.

SPECIFICATION forming part of Letters Patent No. 399,668, dated March 19, 1889.

Application filed November 30, 1888. Serial No. 292,345. (No model.)

*To all whom it may concern:*

Be it known that I, ADOLF JEENEL, residing at Breslau, in the Province of Silesia, in the Kingdom of Prussia, German Empire, have invented certain new and useful Improvements in Vehicle-Brakes, of which the following is a specification.

My invention relates to an improved braking apparatus for vehicles, said braking apparatus being made to work automatically or by hand, at convenience.

Figure 1:
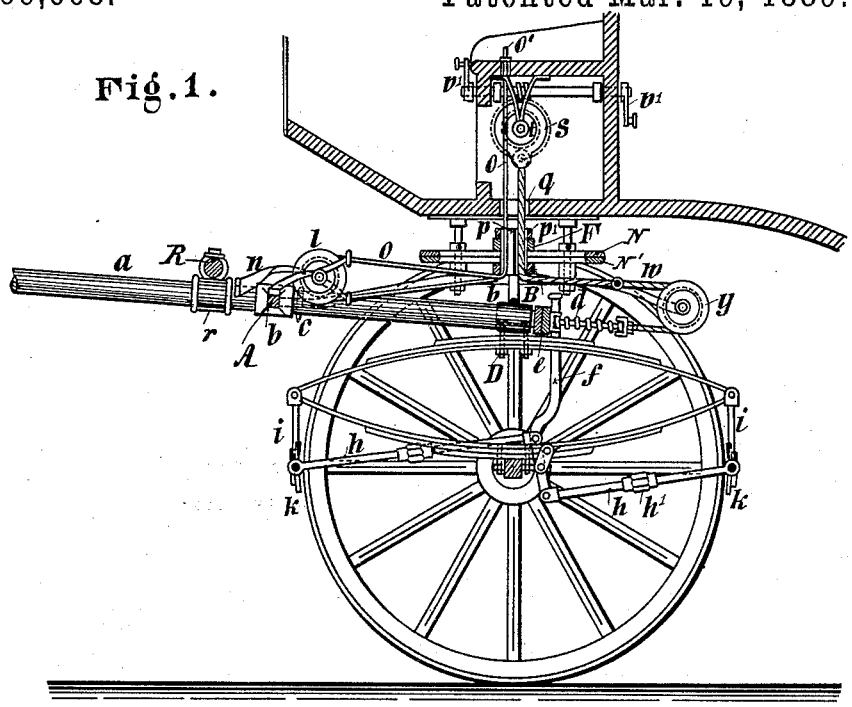
Figure 8:
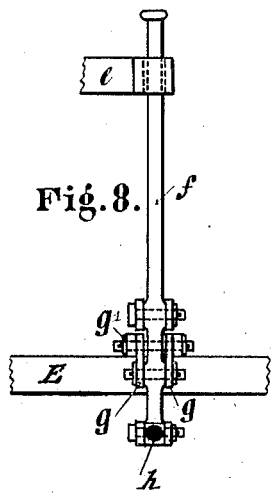
Figure 9:
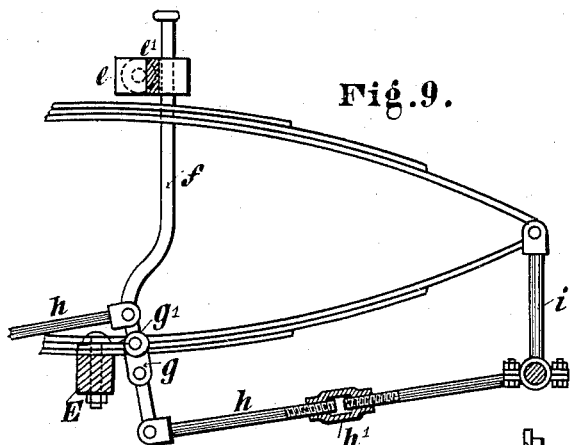
Figure 10:
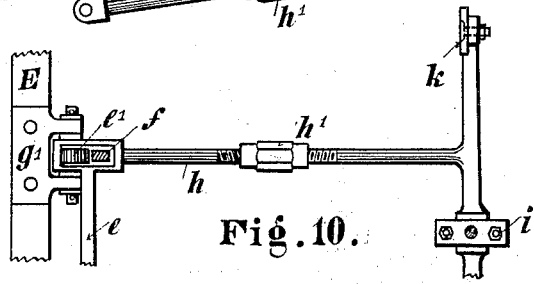
Figure 2:
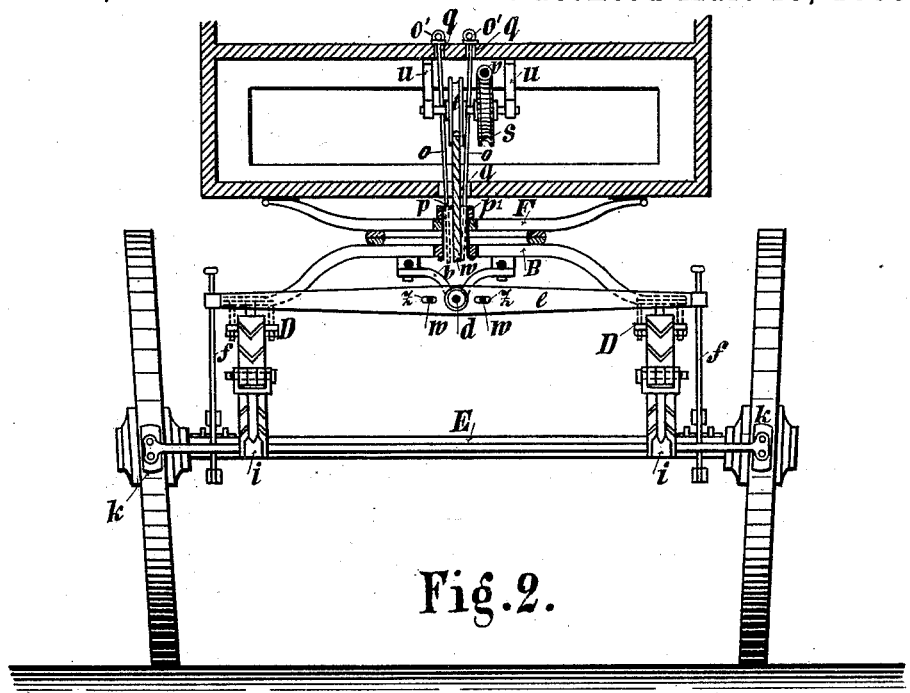
Figure 3:
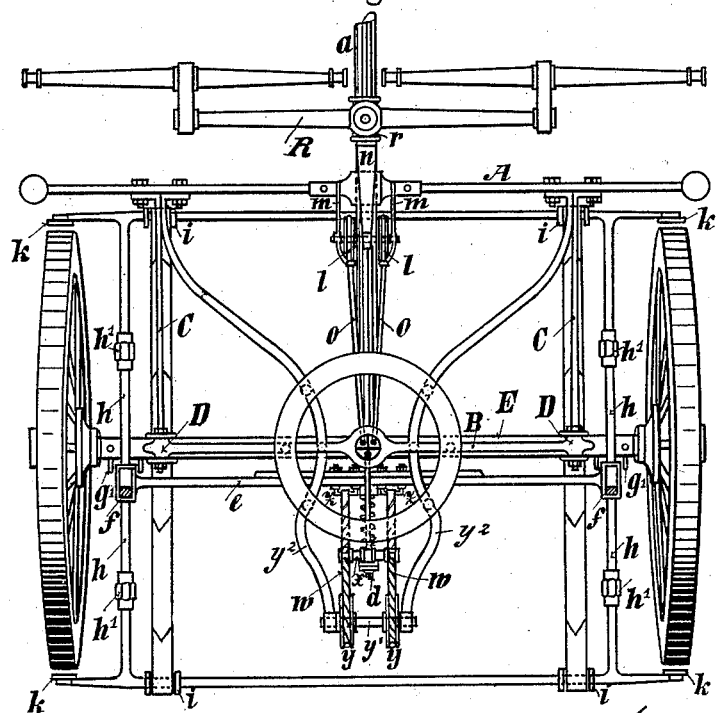
Figure 5:
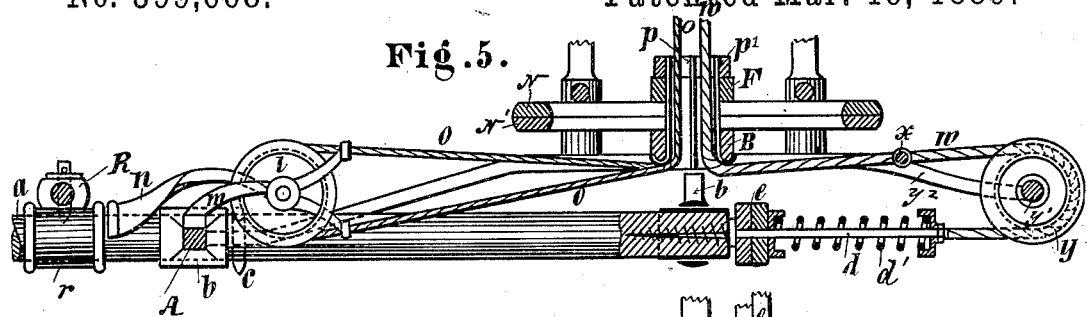
Figure 6:
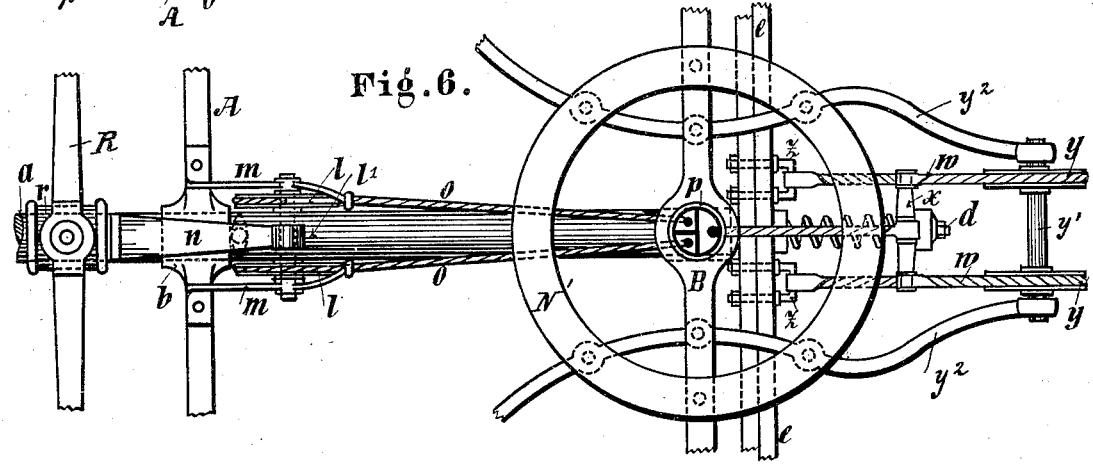
Figure 4:
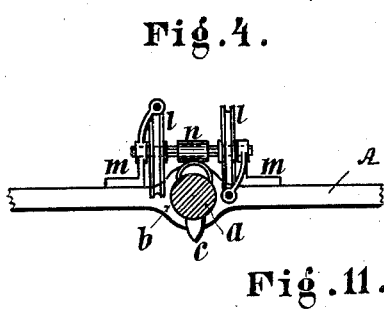
Figure 7:
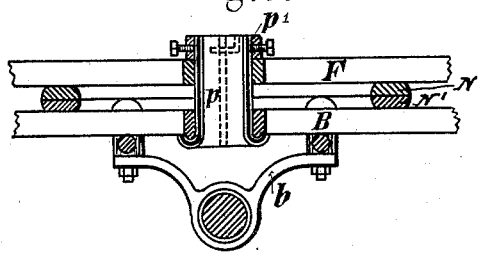
Figure 11:
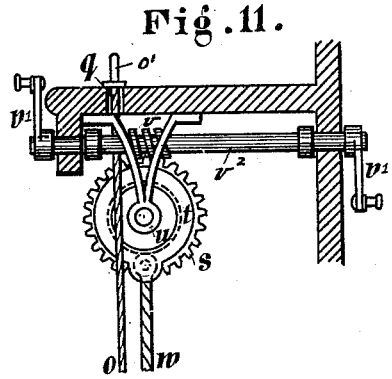
Figure 12:
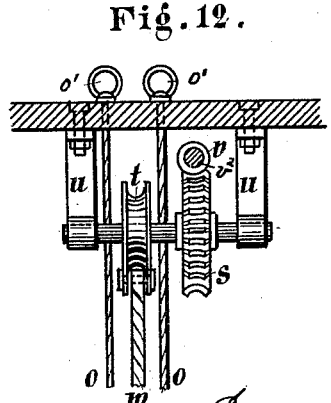

In the accompanying drawings, Figure 1 is a sectional side elevation of the improved braking apparatus of my invention. Fig. 2 is a sectional end view of the same. Fig. 3 is a plan of the same with the seat removed. Fig. 4 is an end view of the stopping device. Fig. 5 is a sectional side elevation of those parts of the apparatus which are located inside the frame of the vehicle. Fig. 6 is a plan corresponding to Fig. 5. Fig. 7 is a cross-section of the box which serves to connect the fore carriage with the other parts of the vehicle. Fig. 8 is an end elevation of a brake-lever rod. Fig. 9 is a side elevation corresponding to Fig. 8. Fig. 10 is a plan corresponding to Fig. 8. Fig. 11 is a side elevation of those parts of the braking apparatus connected to the fore carriage, and Fig. 12 is an end elevation corresponding to Fig. 11.

In describing the improved braking apparatus of my invention I shall begin to explain the automatic brake. Said brake is applied and released by means of the stopping and driving force by which the motion of the vehicle is being checked and imparted again. Accordingly, the action of the brake is automatic. It is made to work by means of a device connected to the horse or draft-cattle and by a sliding pole controlled by said device.

The pole $a$ of the carriage or vehicle is connected to the parts A B C of the carriage-frame, which are rigidly secured to each other and supported by the springs at D. The pole is loosely held within its guides $b$, provided in the cross-bars A and B, and it is arranged to receive a forward sliding motion in the direction of the draft, said forward motion being limited by the cross-pin $c$, bearing against the cross-bar A. To the rear end of the pole $a$ a rod, $d$, is detachably secured, terminating in a disk, and having a spiral spring, $d'$, wound around it. On this rod, between the end of the pole and the said spiral spring, a cross-bar, $e$, is arranged to slide, the ends of which bar are provided each with a lug, within which an anti-friction roller, $e'$, is supported, as shown in Figs. 9 and 10. Within the said lugs the lever-rods $f$, Fig. 9, are guided in a manner to allow the cross-bar $e$, when the fore carriage is swinging up and down upon its springs, to follow up the rocking motion and to slide along the lever-rods $f$, with the rollers $e'$ bearing against said rods.

The outward end of the lever-rods $f$ terminates in a knob or disk. The fulcrum of said rods is provided in the link $g$, said link being arranged to turn on its pivot supported by a bracket, $g'$, secured to the wheel-axle E, Figs. 8 and 9. To the said lever-rods $f$ are hinged, above and below the axle, the two drawing-rods $h$, Fig. 9, each of which consists of two lengths with right and left hand screw-threads on their adjoining ends, said ends being united by a sleeve, $h'$, tapped to fit said screws for the purpose of adjusting the length of said rods $h$. By turning said sleeve one way the rod $h$ will be stretched, its two lengths moving apart. By turning the sleeve the other way it will be shortened, the two lengths being drawn one toward another.

By the ends of the carriage-springs arms $i$ are carried, extending downward and supporting the brake-blocks $k$, rigidly connected to each other by a cross-bar, Figs. 1, 2, 3, and 9. The cross-bar is loosely fitted within the said arms $i$ and rigidly connected to the drawing-bar $h$.

The drawing-bars $h$ are hinged to the lever-rod $f$ in a manner to force the brake-blocks $k$ toward each other and against the wheel by acting on the cross-bar of the arms $i$ when motion is imparted to the said rods $f$.

This automatic braking apparatus is provided with a stopping device to prevent its working, if desired. Said stop-motion consists of the two little wheels $l$, Figs. 5 and 6, rigidly mounted on a common shaft, $l'$, which rests within the two brackets $m$, provided at the forward cross-bar, A, of the fore carriage. The stop-click $n$ is equally rigidly secured to the shaft $l'$. The said wheels $l$ are provided each with a circumferential groove to receive a strap or cord, $o$, secured thereto. Said straps or cords are laid in opposite directions around the two wheels $l$, Fig. 4, by which means one of the said wheels or sheaves $l$ will pay out the strap coiled around it, while the other wheel or sheave will simultaneously wind up the strap. Accordingly the stop-clicket $n$ on the same shaft with the sheaves $l$ will be swung forward or rearward, as one or the other strap $o$ will be tightened to turn its sheave.

In the center of the cross-bar B, supported by the carriage-springs, a box, $p$, or nave of circular cross-section is provided or formed.

In the center of the cross-bar F, Fig. 2, of the upper part of the carriage-frame, on which the coach-box rests, is provided a circular bore of equal diameter with the box or nave $p$ of the bar B, thus allowing to unite the cross-bars F and B by the box $p$ of the lower bar projecting through the bore of the upper bar. By this means the fore carriage is connected to the rear carriage, and the fore carriage may readily turn to either side when the carriage is being turned. The guide-circle or fifth-wheel N, attached to the upper cross-bar, F, rests upon a guide-circle, N′, of equal shape, secured to the lower cross-bar, B, Fig. 2, by which means the fore carriage is strongly supported. The box or nave or hollow trunnion $p$ projects beyond the bore of the cross-bar F, and is locked above said bar F to a collar, $p'$, by means of pins entering through bayonet-slots of the said collar and box. Said pins prevent the collar being lifted. The box and collar besides may be secured to each other by screw-bolts. By this means the upper part of the carriage-frame and the coach-box are reliably secured to the fore carriage.

The straps or cords $o$, secured to the wheels or sheaves $l$, pass through the box $p$, which is rounded off at the lower edges, and lead to the coach-box, where they enter through suitable apertures, $q$, in the foot-board, Figs. 1 and 2, and terminate in handles $o'$ closely behind the sheaves $l$. The straps or cords $o$ pass through guide-lugs, Figs. 4, 5, and 6, provided in extensions of the bracket $m$.

On the pole a sleeve, $r$, is mounted, to which the splinter-bar R is secured, Figs. 1, 3, 5, and 6.

The automatic braking apparatus works as follows: When the carriage is checked or stopped in its motion by the horse or drawing-cattle, it will move forward and slide on the pole $a$. The said pole accordingly will bear with its cross-bar $e$ against the lever-rods $f$, Fig. 3. Said lever-rods $f$ act upon the drawing-bars $h$, and the brake-blocks $k$ are applied to the wheels, as described, whereby the wheels are braked. In starting the carriage again the pole will be drawn forward till the pin $c$ bears against the cross-bar A, the bar $e$ will release the lever-rods $f$, and the brake-blocks are lifted from the wheels. When the stop-motion has been applied to the automatic brake, the click $n$ is swung forward and rests upon the pole, while the latter is drawn forward as far as the pin $c$ will permit. The carriage being checked or stopped, the pole cannot recede, as the sleeve $r$ on the pole will bear against the click $n$. Accordingly the brake is out of action. For releasing the stop-motion, the click $n$ is swung to the other side, and the brake will again be free to act. The said stop-motion may be applied or released from the coach-seat by drawing one or the other of the handles $o'$ of the two straps or cords $o$ to turn either of the sheaves $l$ on the shaft $l'$, on which the click $n$ is mounted.

In order to work this braking apparatus by hand, the following arrangements are provided: A pulley, $t$, and worm-wheel $s$ are mounted fast upon a common shaft, Figs. 1, 2, 11, and 12, said shaft being supported in bearings provided in brackets $u$ below the coach-seat, Fig. 2. The worm $v$, gearing with the worm-wheel $s$, is made integral with its shaft $v^2$, which projects from the front and rear side of the coach-seat and has its bearings provided therein. Winch-handles $v'$ are secured to both ends of said shaft. To the pulley $t$ a strap or cord, $w$, is secured, which passes down through the box $p$, Fig. 5. Then the strap is split in two parts, kept apart by a cross-bar, $x$. The two cords then run over pulleys $y$, fast on their shaft, and with their free ends are secured to lugs $z$ of the cross-bar $e$, Fig. 6.

The shaft $y'$ of the two pulleys $y$ is supported in bearings provided in brackets $y^2$, secured to the cross-bar B, Figs. 3 and 6. The pulleys $t$ and $y$ have circumferential grooves to receive the strap or cord $w$.

In using this braking device the worm-shaft is turned by either of the winch-handles $v'$, Figs. 1 and 11. The shaft may be turned to either side, as the cord $w$ is attached to the lower side of the pulley $t$. The worm $v$, in gear with the wheel $s$, imparts motion to the said wheel and to the pulley $t$, mounted upon the same shaft. The strap or cord $w$ is wound upon the pulley $t$ and lifted. The free ends of said strap or cord being connected to the cross-bar $e$, the latter is drawn back, Fig. 6, and the same effect is thereby obtained as if the bar $e$ had been pushed back by the pole $a$, as described with reference to the automatic braking apparatus. The bar $e$ while drawn back will act upon the spiral spring wound up around the rod $d$ and the spring will be compressed. On turning the worm-shaft in the opposite direction the spring on the rod $d$ will force the cross-bar $e$ toward the pole, and the brake-blocks are again lifted from the wheels.

The winch-handles $v'$ may at any time be released without lifting the brake. The screw-threads of the worm being at nearly right angles to the cogs of the wheel $s$, the said wheel will keep its position until the worm-shaft is turned in the opposite direction.

The automatic braking device is located within the movable part of the fore carriage, Fig. 1, and accordingly it is independent of the position which this part of the carriage is keeping with reference to the other parts if while going the carriage will turn from the straight line of motion.

The box $p$, which unites the supporting cross-bars B and F, contains the straps or cords $o$ of the stop-motion, as also the strap or cord $w$ of the pulley $l$, to be worked by hand. The hand braking apparatus accordingly is equally independent of the position of the fore carriage, the center of motion of which is formed by the said box $p$. The bore of said box $p$ is subdivided by partitions, Figs. 5 and 6, to keep the two straps $o$ and strap $w$ out of contact.

I claim as my invention—

1. The combination of sliding pole $a$ with cross-bar $e$, levers $f$, rods $h$, and brake-shoes $k$, substantially as specified.

2. The combination of shaft $a$ and stop $r$ with sheaves $l$, secured to the carriage-body, and with cords $o$, wound on sheaves $l$ in opposite directions, and with click $n$ on shaft $l'$ of sheaves $l$, substantially as specified.

3. The combination of bar $e$, rods $h$, and brake-shoes $k$ with straps $w$, sheave $t$, worm-wheel $s$, worm $v$, and handles $v'$, substantially as specified.

In testimony whereof I hereunto sign my name, in the presence of two subscribing witnesses, this 7th day of November, 1888.

ADOLF JEENEL.

Witnesses:
EMIL BECKER,
AUGUST HOFFMANN.